(12) United States Patent
Khemakhem et al.

(10) Patent No.: US 9,187,965 B2
(45) Date of Patent: Nov. 17, 2015

(54) METHOD AND SYSTEM FOR EVALUATING GROUPS OF THREADED CONNECTIONS

(71) Applicants: A. S. David Khemakhem, Sugar Land, TX (US); Mark W. Biegler, Houston, TX (US); David A. Baker, Bellaire, TX (US); Jason A. Burdette, Houston, TX (US); Bruce A. Dale, Sugar Land, TX (US); John W. Mohr, Missouri City, TX (US); Ismail Ceyhan, Houston, TX (US); James Powers, Houston, TX (US); James H. Myers, Katy, TX (US); Marcus Asmann, Pearland, TX (US)

(72) Inventors: A. S. David Khemakhem, Sugar Land, TX (US); Mark W. Biegler, Houston, TX (US); David A. Baker, Bellaire, TX (US); Jason A. Burdette, Houston, TX (US); Bruce A. Dale, Sugar Land, TX (US); John W. Mohr, Missouri City, TX (US); Ismail Ceyhan, Houston, TX (US); James Powers, Houston, TX (US); James H. Myers, Katy, TX (US); Marcus Asmann, Pearland, TX (US)

(73) Assignee: ExxonMobil Upstream Research Company, Houston, TX (US)

(*) Notice: Subject to any disclaimer, the term of this patent is extended or adjusted under 35 U.S.C. 154(b) by 254 days.

(21) Appl. No.: 14/056,704

(22) Filed: Oct. 17, 2013

(65) Prior Publication Data

US 2014/0041864 A1 Feb. 13, 2014

Related U.S. Application Data

(62) Division of application No. 12/086,569, filed as application No. PCT/US2006/044893 on Nov. 20, 2006, now Pat. No. 8,590,641.

(60) Provisional application No. 60/760,737, filed on Jan. 20, 2006.

(51) Int. Cl.
*E21B 17/02* (2006.01)
*B23Q 17/20* (2006.01)

(Continued)

(52) U.S. Cl.
CPC ............. *E21B 19/165* (2013.01); *E21B 17/042* (2013.01); *F16L 15/006* (2013.01); *Y10T 29/49766* (2015.01)

(58) Field of Classification Search
CPC ................................ E21B 17/02; B23Q 17/20
USPC ......................................... 175/320; 29/407.02
See application file for complete search history.

(56) References Cited

U.S. PATENT DOCUMENTS 4,703,954 A * 11/1987 Ortloff .................. F16L 15/003
 285/115
4,707,001 A 11/1987 Johnson (Continued)

OTHER PUBLICATIONS

A. P. Assanelli et al., "Finite element models of OCTG threaded connections", *Computers and Structures*, 1993, pp. 725-734, vol. 47, No. 4/5, Great Britain.

(Continued)

*Primary Examiner* — Kenneth L Thompson
(74) *Attorney, Agent, or Firm* — ExxonMobil Upstream Research-Law Department

(57) ABSTRACT

A method associated with the selection of tubulars for hydrocarbon production is described based upon evaluating the performance limits of threaded connections. Constituents of an evaluation group of threaded connections are determined and then a first group of the connections is evaluated via model analysis over a range of conditions. Then, physical testing on a first group of threaded connections in the evaluation group is conducted over that range of conditions. Once modeled, the results from the physical testing and the modeling analysis of the first group are compared to assess a characteristic performance factor for the first group. A second group of threaded connections are determined and the assessed performance factor from the first group is applied to a second group, and the performance limits of the second group are defined over the range of conditions based on this characteristic performance factor, without requiring testing the second group.

25 Claims, 5 Drawing Sheets

(51) Int. Cl.
*E21B 19/16* (2006.01)
*E21B 17/042* (2006.01)
*F16L 15/00* (2006.01)

(56) References Cited

U.S. PATENT DOCUMENTS

| | | | |
|---|---|---|---|
| 4,962,579 | A | 10/1990 | Moyer et al. |
| 5,212,885 | A | 5/1993 | Buonodono et al. |
| 5,411,301 | A | 5/1995 | Moyer et al. |
| 5,661,888 | A | 9/1997 | Hanslik |
| 5,689,871 | A | 11/1997 | Carstensen |
| 5,895,079 | A | 4/1999 | Carstensen et al. |
| 6,041,487 | A | 3/2000 | Banker et al. |
| 6,123,368 | A | 9/2000 | Enderle |
| 6,176,524 | B1 | 1/2001 | Tsuru et al. |
| 6,363,598 | B1 | 4/2002 | Staudt et al. |
| 6,502,041 | B1* | 12/2002 | Noel ............... G01B 3/40 702/150 |
| 6,607,220 | B2 | 8/2003 | Sivley, IV |
| 8,744,160 | B2* | 6/2014 | Bonadeo ............ G01B 11/0616 378/9 |
| 2003/0156918 | A1* | 8/2003 | Benedict ............... E21B 17/042 411/81 |
| 2003/0178847 | A1 | 9/2003 | Galle, Jr. et al. |
| 2005/0248153 | A1* | 11/2005 | Sugino ................ E21B 17/042 285/333 |
| 2008/0319720 | A1* | 12/2008 | Ellis ................... F16L 15/004 703/2 |
| 2011/0313720 | A1* | 12/2011 | Li ..................... E21B 17/042 702/155 |
| 2015/0127308 | A1* | 5/2015 | Thomas, Jr. ............ G06F 17/10 703/2 |

OTHER PUBLICATIONS

Ceyhan, Ismail et al., "Connection Evaluation Program", ExxonMobil Upstream Research Company, Mar. 2001, 55 pages, 1st Edition, Houston, TX.

Hilbert Jr., L. B. et al., IADC/SPE 23904, "Evaluation of Premium Threaded Connections Using Finite-Element Analysis and Full-Scale Testing", IADC/SPE Drilling Conference, Feb. 18-21, 1992, pp. 563-580, New Orleans, LA.

Payne, M. L. et al., "A New International Standard for Casing/Tubing Connection, Testing", SPE/IADC 52846, 1999 SPE/IADC Drilling Conference, Mar. 9-11, 1999, pp. 1-12, Amsterdam, The Netherlands.

Powers, James P. et al., "Application of Connection Productline Evaluation", IADC/SPE 112639, 2008 IADC/SPEC Drilling Conference, Mar. 4-6, 2008, pp. 1-6, Orlando, FL.

Reynolds, G. F. et al., SPE 21739, "A New Approach to the Design of Threaded Connections", SPE Production Operations Symposium, Apr. 7-9, 1991, pp. 959-964, Oklahoma City, OK.

Schwind, Brian, "Mobil Qualifies Three Tubing/Casing Connection Product Lines", Hart's Petroleum Engineer International, Nov. 1998, pp. 59-62.

Abstract of Japanese Unexamined Publication No. 2002-174375, Jun. 21, 2002, Kawasaki Steel Corp., (machine translation from Japanese to English—cited in corresponding Japanese application), 1 page.

Abstract of Japanese Unexamined Publication No. 2004-077022, Sep. 29, 2005, JFE Steel KK, (machine translation from Japanese to English—cited in corresponding Japanese application), 1 page.

Abstract of Japanese Unexamined Publication No. 2002-079340, Mar. 19, 2002, Nissan Motor Company, (machine translation from Japanese to English—cited in corresponding Japanese application), 1 page.

European Search Report No. 113546, Aug. 2, 2006, 3 pages.

* cited by examiner

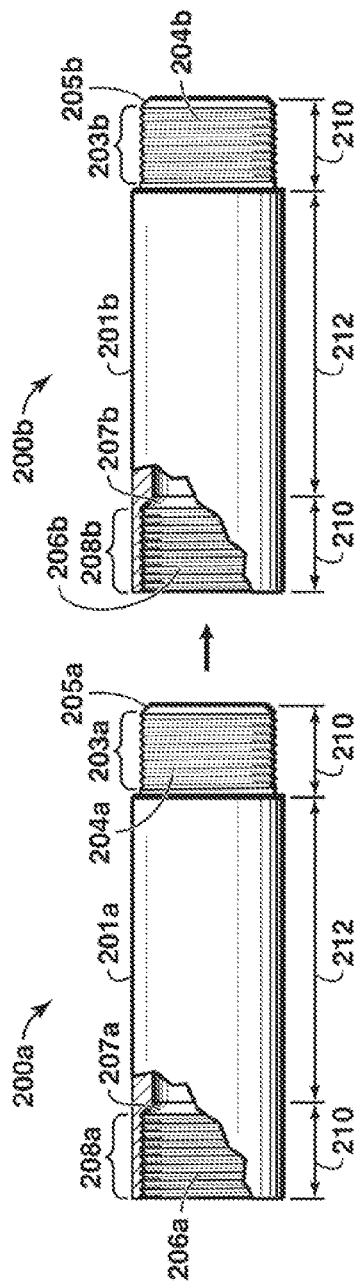
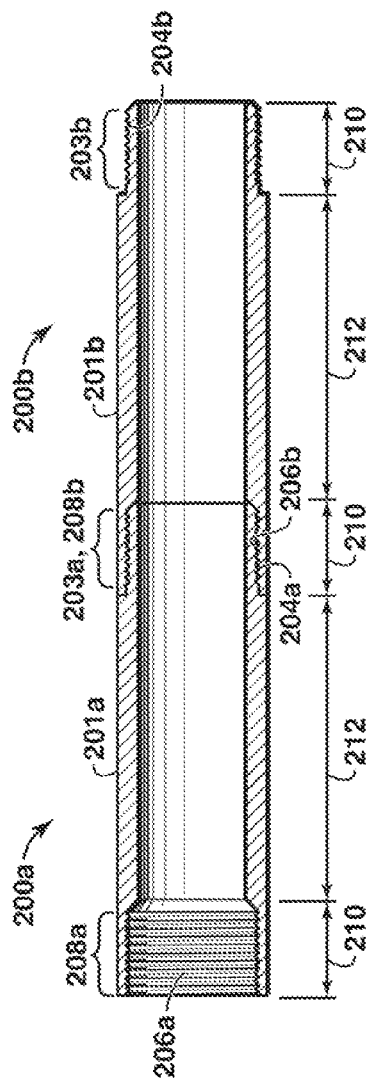
FIG. 2A
FIG. 2B

METHOD AND SYSTEM FOR EVALUATING GROUPS OF THREADED CONNECTIONS

CROSS REFERENCE TO RELATED APPLICATIONS

This application is a divisional of co-pending U.S. application Ser. No. 12/086,569, filed 16 Jun. 2008, which is the National Stage of International Application No. PCT/US06/44893, filed 20 Nov. 2006, which claims the benefit of U.S. Provisional Application No. 60/760,737, filed 20 Jan. 2006, each of which is incorporated herein by reference in its entirety.

FIELD OF THE INVENTION

This invention relates generally to a method for evaluating performance limits of a group of threaded connections having similar characteristics. More particularly, this invention relates to a method for conducting this evaluation on a group of threaded connections associated with a characteristic performance factor with limited physical testing of the threaded connections.

BACKGROUND

The production of hydrocarbons, such as oil and gas, has been performed for numerous years. To produce these hydrocarbons, a production system may utilize various devices, such as tubular members, within a well. Typically, the tubular members are placed within the wellbore to provide structural support, zonal isolation, and allow for communication between subterranean formations and surface facilities. That is, the tubular members may provide flow paths for formation fluids, such as hydrocarbons, within the wellbore and to facilities located at the surface. As these tubular members are individual sections of pipes, two or more tubular members may be joined together by threaded connections or welds to provide this functionality within a well.

For the threaded connections, two distinct classifications are utilized, which are API (American Petroleum Institute) and premium connections. API connections typically rely on entrapment of thread compound in the helical thread paths to provide sealability. See U.S. Pat. Nos. 5,411,301 and 5,212,885. Alternatively, premium connections typically rely on a metal-to-metal seal formed by the threaded connections to provide sealability. See U.S. Pat. No. 6,041,487. These metal-to-metal seals are integral to the design of the connectors of the tubular members.

Regardless of the classification, threaded connections in a wellbore are generally designed to maintain structural integrity and sealability performance during the life of the well for various environmental and safety reasons. For example, sealability is one performance characteristic of the threaded connection that describes how pressurized reservoir or injection fluids are contained within the tubular member. Sealability performance of the threaded connections is affected by, among other things, the fluids being transported, temperature, pressure, tensile and compressive loads, bending, surface finish, thread compound, base material properties, connection geometry, make-up torque and other factors. Also, the threaded connections are exposed to different conditions during make-up, during placement into the wellbore, and/or during production and injection cyclic loading. As such, sealability is one performance measure that may be assessed during evaluation of the threaded connections formed by different tubular members.

Various methods may be utilized to assess the performance of the threaded connections. One method for evaluating performance of a threaded connection is to physically test the threaded connection under possible conditions expected during its lifetime. For this method, an understanding of anticipated field operations should be considered to provide performance results that accurately reflect the environment that the threaded connection is likely to experience. Because of the complexity, physical testing is expensive and time consuming, often taking several months to complete with costs of several hundred thousands of dollars.

A second method for evaluating performance of a threaded connection may include finite element analysis (FEA). FEA may assess the contact characteristics of connection features (i.e. the metal-to-metal seals, threads, etc.) as well as the stress-strain response of the threaded connection under varying load conditions. While the FEA method is generally inexpensive and not time consuming, assessing threaded connection performance based solely on computational criteria may be misleading. For instance, the FEA method does not capture micro-mechanisms, such as surface interactions during make-up. In some evaluations, a false positive is achieved, indicating that the computational criteria are met for a specific load, but subsequent physical testing indicates that the threaded connection does not achieve the predicted performance. In other evaluations, physical testing may reveal adequate performance, while the computational criteria of the FEA method were not satisfied. Finally, while FEA may be used to assess stress-strain response, it may not be used to explicitly assess the impact of certain parameters, such as thread compound and surface finish, on performance. As such, while using a FEA only method to evaluate threaded connection performance reduces the amount of time and cost to identify candidate threaded connections for a given application, the individual threaded connections are generally each physically tested to ensure adequate performance.

A third method for evaluating performance of a threaded connection is to use FEA in combination with limited physical testing. See Hilbert et al., "Evaluation of Premium Threaded Connections Using Finite-Element Analysis and Full-Scale Testing," SPE 23904 (1992). This method utilizes a standardized test program to verify the integrity of the threaded connections. A result from this type of evaluation is typically valid for any application (i.e., not specific to an individual well or loading condition). However, extrapolating the results from one test program of one connection geometry (i.e., diameter and wall thickness) to a different geometry is challenging and problematic. In addition, the cost associated with performance assessment of geometrically similar threaded connections is high.

An example of this method includes the commercial use of an FEA criteria to evaluate sealability in the United States in 2004. In this use, the sealability criteria were developed from comparisons of seal versus leak behavior exhibited during physical testing with behavior predicted by FEA. The FEA criteria were then applied to FEA results from subsequent connection evaluations to assess load and pressure combinations at which adequate sealability performance was expected. These results were then placed into a database and used to make commercial decisions about equipment purchases.

Further, although the approach described above has typically been used for the evaluation of individual threaded connections, it was also applied in 2004 to the evaluation of connection groups in the United States. In this application, physical testing was performed on threaded connections at the geometric extremes of a group. The FEA results were utilized for commercial purposes to aid in interpolation of sealability between these extremes for other threaded connections. These results were then placed into a database and used to make commercial decisions about equipment purchases.

Limitations of the prior evaluation methods include (1) the lack the proper scalability for the individual threaded connections; and (2) the expense or time consumed by the methods. Also, threaded connections contained in the evaluation group were not selected based on any criteria to ensure that their individual performance limits should be similar to other threaded connections in the group. As such, the need exists for a method for evaluating a group of threaded connections with the specificity of physical testing, simplicity of FEA testing, and clarity of performance limits that account for the various factors governing connection performance.

Other related material may be found in at least U.S. Patent Application Publication No. 2003/0178847; U.S. Pat. No. 6,607,220; U.S. Pat. No. 6,363,598; U.S. Pat. No. 6,176,524; U.S. Pat. No. 6,123,368; U.S. Pat. No. 6,041,487; U.S. Pat. No. 5,895,079; U.S. Pat. No. 5,689,871; U.S. Pat. No. 5,661,888; U.S. Pat. No. 5,411,301; U.S. Pat. No. 5,212,885; U.S. Pat. No. 4,962,579; and U.S. Pat. No. 4,707,001.

SUMMARY

In one embodiment, a method associated with the evaluation of performance limits of threaded connections is described. In this method, constituents of an evaluation group of threaded connections are determined via model analysis, wherein the evaluation group includes a first plurality of the threaded connections and a second plurality of the threaded connections. Then, physical testing on the first plurality of the threaded connections in the evaluation group is conducted. Modeling analysis on the first plurality of threaded connections and the second plurality of threaded connections is performed, wherein the second plurality of threaded connections are not physically tested. Once modeled, the results from the physical testing and the modeling analysis are compared to assess a characteristic performance factor for the first plurality of threaded connections. Then, the characteristic performance factor is applied to the second plurality of threaded connections, and the performance limits are defined based on this characteristic performance factor.

In an alternative embodiment, a method associated with the production of hydrocarbons is described. This method includes evaluating an evaluation group of threaded connections, wherein a first plurality of the threaded connections in the evaluation group and a second plurality of threaded connections in the evaluation group are analyzed by a modeling analysis and only the first plurality of the threaded connections in the evaluation group are physically tested; obtaining tubular members based on the evaluation of the threaded connections; installing the tubular members within a wellbore; and producing formation fluids from the tubular members.

In a second alternative embodiment, a method associated with the evaluation of threaded connections is described. The method includes conducting physical testing on a first plurality of the threaded connections in an evaluation group; performing modeling analysis on the first plurality of threaded connections and a second plurality of threaded connections in the evaluation group, wherein the second plurality of threaded connections are not physically tested; comparing results from the physical testing and the modeling analysis to assess a performance factor for the first plurality of threaded connections, wherein the performance factor is at least one of structural integrity factor, galling resistance factor, environmental resistance factor, fatigue resistance factor and any combination thereof; applying the performance factor to the second plurality of threaded connections; and defining the performance limits based on this characteristic performance factor.

BRIEF DESCRIPTION OF THE DRAWINGS

The foregoing and other advantages of the present technique may become apparent upon reading the following detailed description and upon reference to the drawings in which:

FIGS. 2A-2B are exemplary views of two tubular members utilized in the production system of FIG. 1 being coupled together with a metal-to-metal seal;

DETAILED DESCRIPTION

In the following detailed description, the specific embodiments of the present invention are described in connection with its preferred embodiments. However, to the extent that the following description is specific to a particular embodiment or a particular use of the present techniques, it is intended to be illustrative only and merely provides a concise description of the exemplary embodiments. Accordingly, the invention is not limited to the specific embodiments described below, but rather; the invention includes all alternatives, modifications, and equivalents falling within the true scope of the appended claims.

The present technique describes a method of using a characteristic performance factor, such as the sealability factor, to assist in the evaluation of the threaded connections. Under the present techniques, modeling, such as finite element analysis, may be performed on the threaded connections to identify constituents of an evaluation group. Then, additional finite element analysis is utilized for each threaded connection in the evaluation group, while only a limited number of threaded connections within this group are physically tested. The results or data from the physical tests and the finite element analysis are used to confirm model response and adjust the value of the characteristic performance factor for the evaluation group. In this manner, a single performance factor may be defined for threaded connections with similar characteristics and exhibiting similar performance based on a combination of modeling and limited physical testing. Thus, the present techniques provide an efficient mechanism for evaluating threaded connections.

Figure 1:
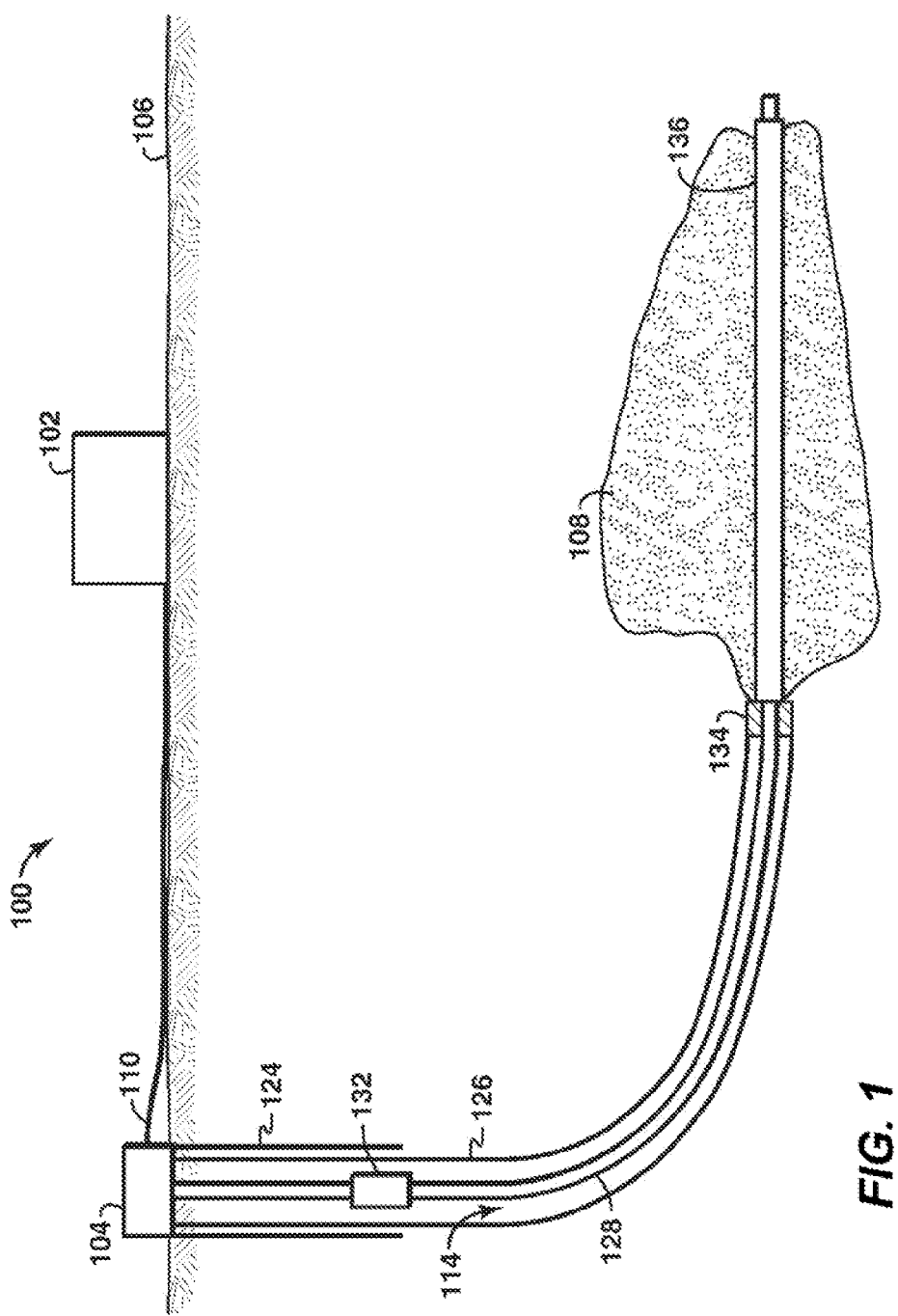
FIG. 1 is an exemplary production system in accordance with certain aspects of the present techniques.

Turning now to the drawings, and referring initially to FIG. 1, an exemplary production system 100 in accordance with certain aspects of the present techniques is illustrated. In the exemplary production system 100, a surface facility 102 is coupled to a tree 104 located on the surface 106 of the Earth. Through this tree 104, the surface facility 102 accesses one or more subsurface formations, such as subsurface formation 108, which may include multiple production intervals or zones having hydrocarbons, such as oil and gas. Beneficially, tubular members, such as a surface casing string 124, intermediate or production casing string 126 and/or production tubing string 128, may be utilized within the wellbore 114 to enhance the production of hydrocarbons from the subsurface formation 108. However, it should be noted that the production system 100 is illustrated for exemplary purposes and the present techniques may be useful in the production or injection of fluids from any subsea, platform or land location.

The surface facility 102 is configured to monitor and produce hydrocarbons from the subsurface formation 108. The surface facility 102 may include storage tanks and/or processing vessels that are utilized to handle the production of formation fluids, such as hydrocarbons. To access the production intervals of the subsurface formation 108, the surface facility 102 is coupled to the tree 104 via a pipeline 110. The pipeline 110 may include sections of tubular members that are coupled together via welded or threaded connections.

To access the subsurface formation 108, the wellbore 114 penetrates the surface 106 to a depth that interfaces with the production interval of the subsurface formation 108. The tree 104, which is positioned over the wellbore 114 at the surface 106, provides an interface between devices within the wellbore 114 and the surface facility 102. Accordingly, the tree 104 may be coupled to the surface casing string 124, the production casing string 126 and/or production tubing string 128 to provide fluid flow paths. The devices within the wellbore 114 may include a subsurface safety valve 132, packer 134, and one or more tools 136. The subsurface safety valve 132 may be utilized to block the flow of fluids from the production tubing string 128 in the event of rupture or break above the subsurface safety valve 132. Further, the packer 134 may be utilized to isolate specific zones within the wellbore annulus from each other. Also, the tools 136 may include sand control devices or other flow control devices that are utilized to provide flow paths for the hydrocarbons in the subsurface formation 108.

To provide stability and prevent leakage within the wellbore 114, the production system 100 may also include different tubular members or tubulars, such as the surface casing string 124, the production casing string 126 and/or the production tubing string 128. The surface casing string 124 may be installed from the surface 106 to a location at a specific depth beneath the surface 106. Within the surface casing string 124, the intermediate or production casing string 126, which may extend down to a depth near the subsurface formation 108, may be utilized to provide support for walls of the wellbore 114. The surface and production casing strings 124 and 126 may be cemented into a fixed position within the wellbore 114 to further stabilize the wellbore 114. Within the surface and production casing strings 124 and 126, a production tubing string 128 may be utilized to provide flow paths through the wellbore 114 for hydrocarbons and other fluids. Sections of each of the surface casing string 124, the production casing string 126 and/or the production tubing string 128 may be joined or coupled with threaded connections, as discussed above.

As an example of a threaded connection, FIGS. 2A-2B are exemplary views of two tubular members in the production system of FIG. 1 being joined together. Accordingly, FIGS. 2A-2B may be best understood by concurrently viewing FIG. 1. In FIGS. 2A-2B, two tubular members 200a and 200b are shown in an exploded and sealed configuration. However, it should be noted that the tubular members 200a and 200b may be any two or more sections of the surface casing string 124, the production casing string 126 and/or the production tubing string 128.

In FIG. 2A, the first tubular member 200a and second tubular member 200b each have a main body section 201a and 201b, a neck section 203a and 203b, and notched section 208a and 208b. The tubular members 200a and 200b may be made of steel or steel alloys with the main body sections 201a and 201b configured to be a specific length 212, such as 30 to 40 feet (ft), having specific internal and outer diameters. The neck section 203a and 203b may have external threads 204a and 204b, while the notched section 208a and 208b have internal threads 206a and 206b. Also, the neck section 203a and 203b may have metal-to-metal seal sections 205a and 205b, while the notched section 208a and 208b may have metal-to-metal seal sections 207a and 207b. These metal-to-metal seal sections 205a, 205b, 207a and 207b may form a seal for at least a portion of a sealing length 210. The external threads 204a and 204b may be configured to join with the internal threads 206a and 206b to form the tight seal between tubular members 200a and 200b, as shown in FIG. 2B.

In FIG. 2B, the neck portion 203a of the first tubular member 200a is coupled with the notched portion 208b of the second tubular member 200b. The tubular members 200a and 200b are coupled together by engaging the external threads 204a with the internal threads 206b to form a threaded connection. The seal, which is formed by the metal-to-metal seal sections 205a, 205b, 207a and 207b and threads 204a, 204b, 206a and 206b, may prevent leaks. Accordingly, by utilizing the threaded connection, the tubular members 200a and 200b may be secured together to form a continuous flow path within the wellbore 114, which may also be utilized to stabilize the wellbore 114.

The tolerance for leakage through the threaded connection may vary for different applications, as noted above. For instance, threaded connections in harsh environments, such as within the wellbore 114, may involve extreme pressures and temperatures as the wellbore penetrates greater depths and is subjected to different environments. Again, the performance of threaded connections may be influenced by the fluids being transported, temperature, pressure, tensile and compressive loads, bending, surface finish, thread compound, base material properties, connection geometry, make-up torque, conditions during make-up, conditions while being run, production and/or injection cyclic loading and other reasons. With the high cost of repairing tubular members within the wellbore 114, the surface casing string 124, the production casing string 126 and the production tubing string 128 are generally designed to maintain structural stability and sealability for the life of the well to prevent environmental problems, maintain production, and maintain safety. As such, the threaded connections may operate for the life of the well.

To assess the performance of threaded connections various characteristic performance factors, such as a sealability factor, structural integrity factor, galling resistance factor, environmental resistance factor, fatigue resistance factor or any combination thereof may be utilized. It should be noted that it may be beneficial to utilize only one of the characteristic performance factors for an evaluation group. As an example of the characteristic performance factors, the sealability factor is a characteristic of the threaded connection that describes how well pressurized reservoir or injection fluids are contained within the tubular. The sealability factor of the threaded connections is affected by, among other things, the fluids being transported, temperature, pressure, tensile and compressive loads, bending, surface finish, thread compound, base material properties, connection geometry, make-up torque and other factors. Also, the sealability factor is influenced by different conditions experienced during make-up, during placement into the wellbore, and/or during production and injection cyclic loading. For these conditions, manufacturing conditions include at least one of base material properties, surface finish, feature dimensions and interferences between features, conditions during assembly and installation of the threaded connection include at least one of make-up torque, make-up speed and thread compound, and service conditions of the threaded connection include at least one of temperature, pressure, tensile, compressive, bending and torsional loads. As such, sealability factor is one performance measure that may be assessed during evaluation of the threaded connections formed by different tubular members.

The structural integrity factor is a characteristic of the threaded connection that describes how well applied loads are distributed among features of the threaded connection. The structural integrity factor is affected by, among other things, temperature, pressure, tensile and compressive loads, bending, surface finish, thread compound, base material properties, connection geometry, make-up torque and other factors. Similar to the discussion above, the manufacturing conditions include at least one of base material properties, surface finish, feature dimensions and interferences between features, conditions during assembly and installation of the threaded connection include at least one of make-up torque, make-up speed and thread compound, and service conditions of the threaded connection include at least one of temperature, pressure, tensile, compressive, bending and torsional loads. Also, the structural integrity factor is influenced by different conditions experienced during make-up, during placement into the wellbore, and/or during production and injection cyclic loading.

The galling resistance factor is a characteristic of the threaded connection that describes how well surface damage due to frictional sliding is endured by features of the threaded connection. The galling resistance factor is affected by, among other things, temperature, pressure, tensile and compressive loads, bending, surface finish, thread compound, base material properties, connection geometry, make-up torque and other factors. For these conditions, manufacturing conditions include at least one of base material properties, surface finish, feature dimensions and interferences between features, conditions during assembly and installation of the threaded connection include at least one of make-up torque, make-up speed and thread compound, and service conditions of the threaded connection include at least one of temperature, pressure, tensile, compressive, bending and torsional loads. Also, the galling resistance factor is influenced by different conditions experienced during make-up, during placement into the wellbore, and/or during production and injection cyclic loading.

The environmental resistance factor is a characteristic of the threaded connection that describes how well applied loads and resultant stresses and strains are handled by the features of the threaded connection in the presence of an aggressive environment. An aggressive environment, for example, is a formation that has fluids containing high levels of hydrogen sulfide ($H_2S$). The environmental resistance factor is affected by, among other things, produced or in-situ fluid composition, temperature, pressure, tensile and compressive loads, bending, surface finish, thread compound, base material properties, connection geometry, make-up torque and other factors. Again, for these conditions, manufacturing conditions include at least one of base material properties, surface finish, feature dimensions and interferences between features, conditions during assembly and installation of the threaded connection include at least one of make-up torque, make-up speed and thread compound, and service conditions of the threaded connection include at least one of temperature, pressure, tensile, compressive, bending and torsional loads. Also, the environmental resistance factor is influenced by different conditions experienced during make-up, during placement into the wellbore, and/or during production and injection cyclic loading The fatigue resistance factor is a characteristic of the threaded connection that describes how well cyclic loading is endured by features of the threaded connection. The fatigue resistance factor is affected by, among other things, temperature, pressure, tensile and compressive loads, bending, surface finish, thread compound, base material properties, connection geometry, make-up torque and other factors. Also, the fatigue resistance factor is influenced by different conditions experienced during make-up, during placement into the wellbore, and/or during production and injection cyclic loading. For these conditions, manufacturing conditions include at least one of base material properties, surface finish, feature dimensions and interferences between features, conditions during assembly and installation of the threaded connection include at least one of make-up torque, make-up speed and thread compound, and service conditions of the threaded connection include at least one of temperature, pressure, tensile, compressive, bending and torsional loads. The life cycle of tubular members within a production system are discussed further in FIG. 3.

Figure 3:
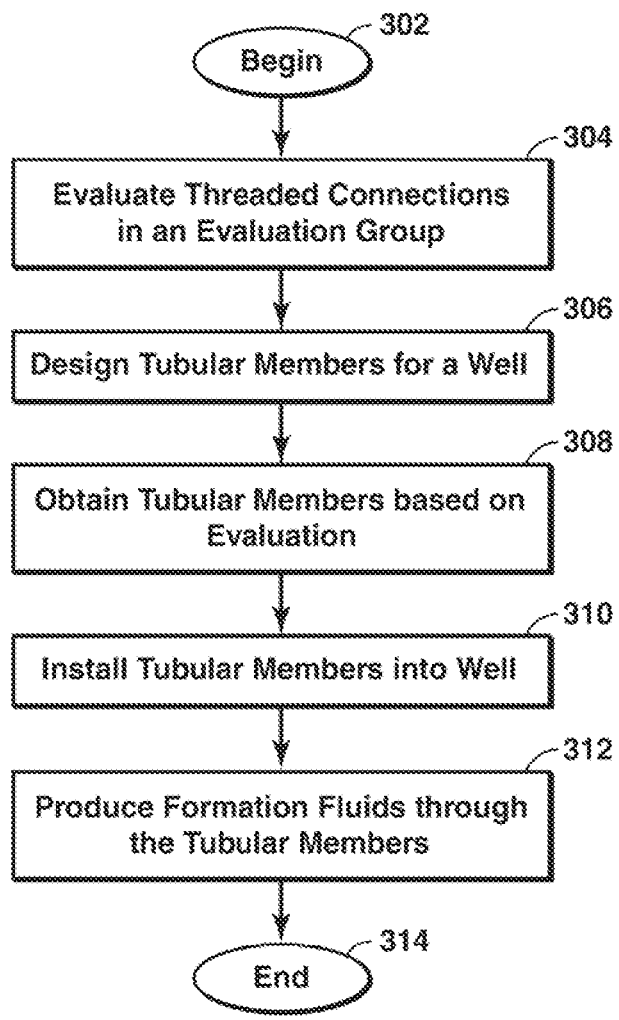
FIG. 3 is an exemplary flow chart of the selection and use of tubular members for the production system of FIG. 1 in accordance with aspects of the present techniques.

FIG. 3 is an exemplary flow chart of the selection and use of tubular members for the production system of FIG. 1 in accordance with aspects of the present techniques. This flow chart, which is referred to by reference numeral 300, may be best understood by concurrently viewing FIGS. 1 and 2. In this flow chart 300, threaded connections may be evaluated prior to being utilized for a specific application. That is, the threaded connections between tubular members may be evaluated to determine specific performance characteristics of groups of threaded connections, such as sealability, structural integrity, galling resistance, environmental resistance and fatigue resistance.

The flow chart begins at block 302. At block 304, threaded connections in an evaluation group are evaluated. The evaluation process, which is described in greater detail in FIG. 4, may include modeling different threaded connections and identifying constituents of an evaluation group based on results of the modeling. Then, the threaded connections in the evaluation group may be subjected to physical testing and FEA. The physical testing may be performed on a subset of the threaded connections that define an envelope of threaded connections, a plurality of envelopes, or envelope with other outlying threaded connections. From the results of the physical and FEA testing, specific characteristics may be scaled to other threaded connections within the evaluation group without any physical testing having to be performed on those threaded connections. At block 306, tubular members for a well may be designed. The design of the tubular members may be based on the well location, geophysical evaluations, or other processes, which are discussed above. The tubular members for the well may be designed based on the conditions at the well location and expected service requirements. Tubular members for the well may then be obtained based on the design and previous threaded connection evaluation, as shown in block 308. It should be noted that the evaluation group may be formed either prior to or after a specific application or oil field is identified.

Once the tubular members are obtained, the tubular members may be installed into the well, as shown in block 310. The tubular members may be installed as part of the drilling operations that are performed to drill the wellbore 114. At block 312, the tubular members may be utilized to produce formation fluids, such as hydrocarbons, through the tubular members. The production of hydrocarbons may include coupling tubular members together, coupling tubular members to the tree 104, and tools 136 to form fluid flow paths through the wellbore 114. These fluid flow paths may allow hydrocarbons to be provided to the surface facilities 102. Accordingly, the process ends at block 314.

Because of the risk and cost involved with producing hydrocarbons, specific characteristic performance factors, such as sealability, structural integrity, galling resistance, environmental resistance or fatigue resistance, of the threaded connection may be evaluated for different tubular members to limit risk of threaded connection failures within the well. However, the evaluation methods previously described are either expensive and time consuming or lack the proper scalability for the individual applications, as noted above. As such, the need exists for a method for evaluating a group of threaded connections with the specificity of physical testing and simplicity of FEA testing, and enables definition of performance limits that account for the various factors governing connection performance, which is discussed in FIG. 4.

Figure 4:
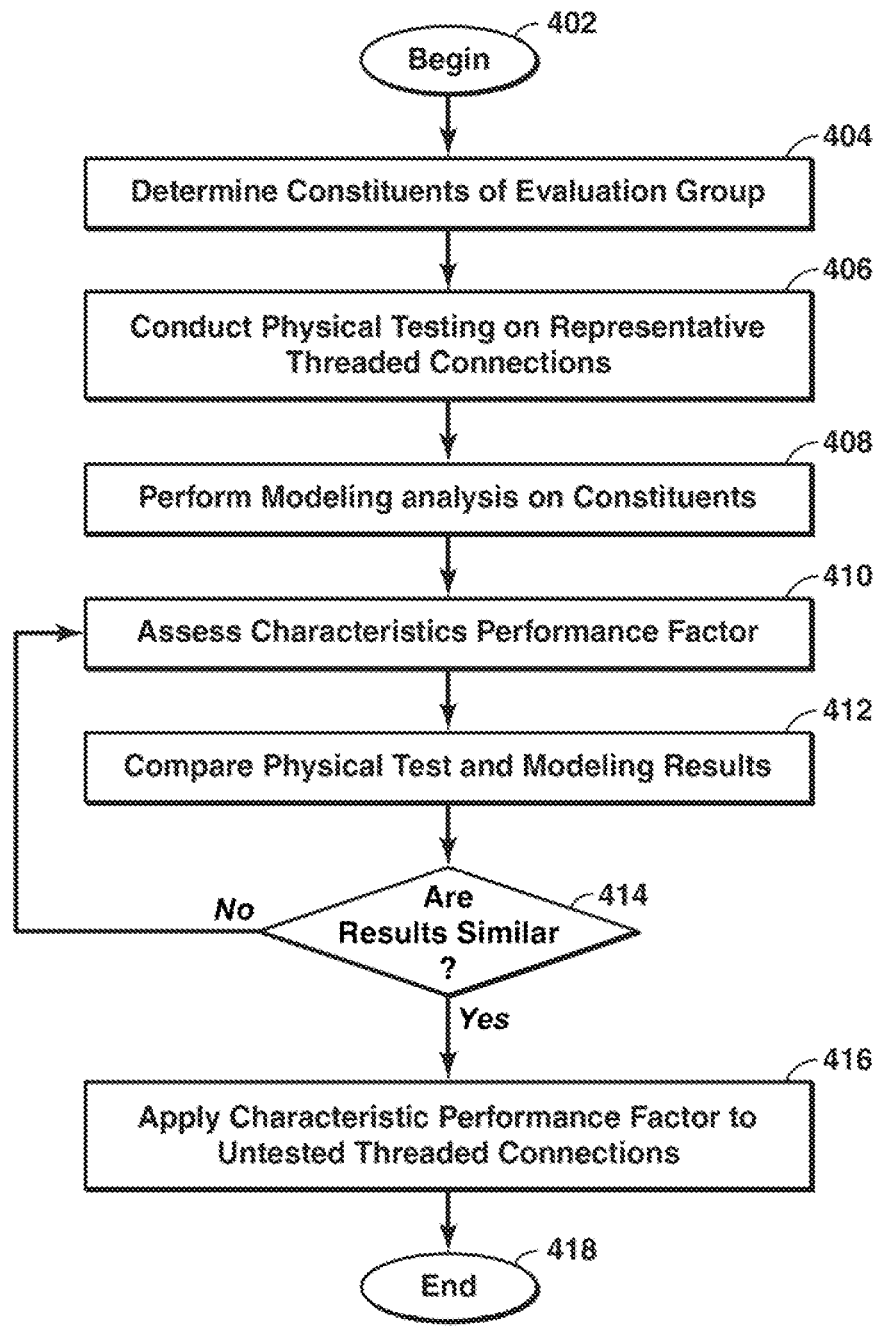
FIG. 4 is an exemplary flow chart of the evaluation process utilized in the flow chart of FIG. 3 in accordance with aspects of the present techniques.

FIG. 4 is an exemplary flow chart of the evaluation process utilized for the production system of FIG. 1 in accordance with aspects of the present techniques. This flow chart, which is referred to by reference numeral 400, may be best understood by concurrently viewing FIGS. 1-3. In this flow chart 400, a process for the physically-based determination of connection performance for which no physical testing has been conducted is described. The process utilizes previously performed physical testing of threaded connections as a basis for the evaluation. Results from these physical tests and modeling analysis may be associated to form a group of threaded connections. For instance, the results from physical tests for threaded connections may be compared with sealability performance using a computationally determined sealability calibration factor 'k'. With this method, specific threaded connections may be physically tested and utilized to define a characterization factor for other threaded connections. The threaded connections within the envelope or defined group may be utilized without the expense or time generally utilized for physical testing each threaded connection.

The flow chart begins at block 402. At block 404, constituents or threaded connections of an evaluation group are determined. Constituents of the evaluation group may include threaded connections having consistent features, such as seal design (spherical or conical), thread design (threads per inch, geometry), shoulder location(s), etc., over the defined range. The constituents of the evaluation group may be formed into an envelope based on manufacturer information provided about the respective tubular members. Alternatively, the constituents of the evaluation group may be identified from modeling analysis of manufacturer information about the tubular members. The modeling analysis may include finite element analysis (FEA) to assess similarities or differences among threaded connections of different sizes, different thread designs, or seal designs.

Once the constituents of the evaluation group are identified, physical testing may be performed on certain representative threaded connections, as shown in block 406. The certain representative threaded connections or constituents may be a subset or group from the evaluation group, while another subset or group from the evaluation group may not be physically tested. The physical testing may be conducted on the representative constituents of the evaluation group to assess the effects of geometric tolerance, load conditions (including bending), temperature, thread compound, surface finish, etc., on a specific performance characteristic, such as connection sealability, structural integrity, galling resistance, environmental resistance or fatigue resistance. These physical tests may be performed based on test programs that comply with specific guidelines. See, e.g., "*Connection Evaluation Program*", 1st Edition, ExxonMobil (2001) and "Petroleum and natural gas industries—Procedures for testing casing and tubing connections," *ISO* 13679 (2002). Then, modeling analysis, such as FEA, is performed on the each of the threaded connections in the evaluation group, as shown in block 408. The modeling analysis may assess standard characteristics of the threaded connection design and determine trends that impact threaded connection performance, such as stiffness, seal contact and shoulder contact. For example, FEA modeling may be used to calculate stress-strain response of features to applied boundary conditions or to calculate contact pressure between features. This type of assessment may be useful in verifying consistency among the threaded connections in the evaluation group for a variety of performance characteristics that may include sealability, structural integrity, galling resistance, environmental resistance factor or fatigue resistance.

Then, the characteristic performance factor, such as sealability performance or other factors noted above, of the threaded connections in the evaluation group may be determined in blocks 410-416. In block 410, the characteristic performance factor may be assessed. This assessment may involve estimating a value for the characteristic performance factor. For instance, if the characteristic performance factor is the sealability factor, a value is estimated above which the connection is hypothesized to seal, but below which the connection is hypothesized to leak. Then, the physical test results are compared with the modeling (i.e., FEA) results for certain representative threaded connections in the evaluation group, as shown in block 412. This comparison may involve determining threaded connection seal or leak response under various applied loading conditions. Then, a determination is made if the results are similar in block 414. This determination may include consideration to a threshold range. If the results are not similar, which may be outside a specific threshold range, the sealability factor is reassessed again in block 410. If the results are similar, which may be within a specific threshold range, the characteristic performance factor is applied to each of the threaded connections that has not been physically tested, as shown in block 416. This may be done by performing additional FEA and calculating the sealability factor for various load combinations. For load combinations with sealability factor above the value determined in block 410, the threaded connection is expected to seal. For load combinations with sealability factor less than the value determined in block 410, the threaded connection is expected to leak. Accordingly, the process ends at block 418.

Although finite element analysis (FEA) is utilized for each threaded connection to determine performance, only a limited number threaded connections with similar design and material properties are physically evaluated to assess performance for a larger grouping or range of threaded connections in a given evaluation group. Additional modeling may also be performed on the physically tested connections to capture details of the evaluation and testing programs, such as unique path dependent behavior. This data from the test programs may be used to confirm model response and adjust the previously identified performance trends. The trends are then used to define sealability performance of each of the threaded connections in the evaluation group. In this manner, limited physical testing may be performed to evaluate the performance limits of threaded connection groups including threaded connections of similar geometries and/or threaded connections exhibiting similar performance characteristics.

In particular, the sealability factor along with the FEA is used to assess the sealability performance limits for both tested and untested connections. Beneficially, the use of the characteristic performance factor assists the evaluation by enabling a single quantity to be applied to each of the constituents of the evaluation group.

Figure 5:
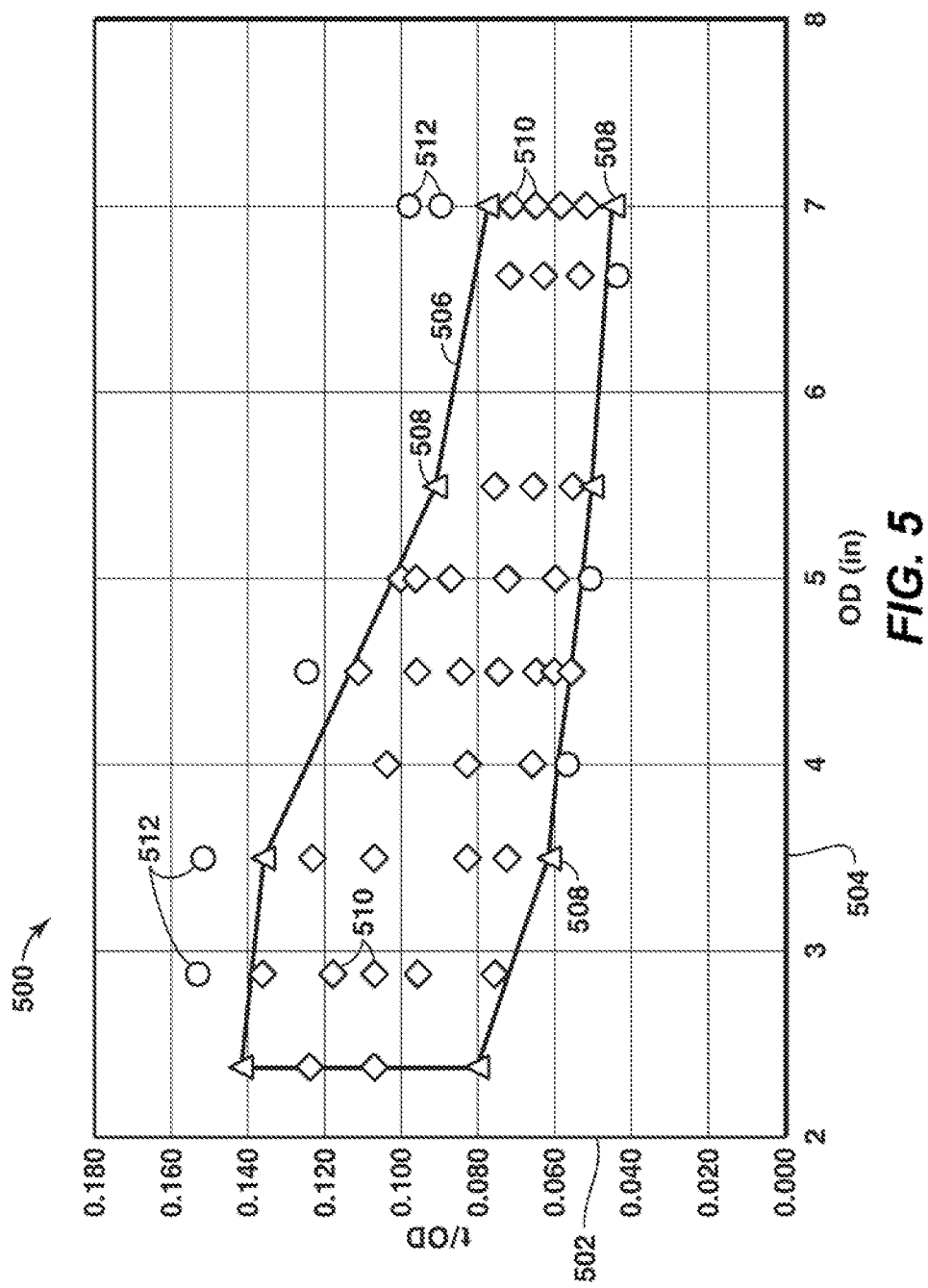
FIG. 5 is a graph of different threaded connections and an envelope formed by the process of FIG. 4 in accordance with certain aspects of the present techniques.

FIG. 5 is a graph of different threaded connections and the evaluation group formed by the process of FIG. 4 in accordance with certain aspects of the present technique. In FIG. 5, threaded connections from tubular members having an outer diameter (OD) 504 from 2⅜ inch (in) to 7 in is shown against the thickness/OD 502 in the form of a graph 500. In this graph 500, an evaluation group of threaded connections includes fifty-two threaded connections, which each have similar features and are composed of similar carbon steel (i.e., from C75 to C95, which encompasses four grades). Each of these individual threaded connections is shown by various points. These points include boundary points 508 (represented by triangular shaped marks), outlying points 512 (represented by circular shaped marks), and internal points 510 (represented by diamond shaped marks). The boundary points 508 form an envelope 506 that defines the threaded connections, which satisfy the thresholds for the respective application.

Under the present techniques, physical testing is performed on representative constituents of the threaded connection family to capture the range of sealability performance of the threaded connection design within the given material property range. For this example, an evaluation group is determined and physical tests are performed on the threaded connections represented by the boundary points 508. Then, FEAs are performed on each of the threaded connections to evaluate the seal and shoulder contact trends associated with the evaluation group. From the FEA analysis, eight threaded connections, which are the outlying points 512, are determined to have performance that is not fully described by the eight threaded connections tests. As such, these threaded connections associated with the outlying points 512 are excluded from the evaluation group, which results in forty-four threaded connections being utilized.

Once the FEA is completed, a single sealability factor is determined from the FEA of the eight physically tested threaded connections. These threaded connections are subjected to additional FEA to capture unique results of the test program. The sealability factor is correlated with the data gathered during physical testing of the threaded connections and may be adjusted based upon the actual test conditions, interference match-ups, make-up torque or other test specific variables. For example, strain measurements may be used to verify that the shoulder interference estimates are properly combined with the FEA models, resulting in a modification to the sealability factor.

Once the adjustments have been made to the sealability factor, it is applied to the remaining thirty-six threaded connections in the evaluation group. That is, the sealability factor of the physically tested threaded connections is utilized with the standardized FEA to assign sealability performance limits for the remaining untested threaded connections in the evaluation group. The result of this analysis is one hundred seventy-six threaded connections with sealability performance. In determining this result, only eight threaded connections were subjected to physical tests, while the performance of the remaining one hundred sixty-eight threaded connections was determined computationally with the sealability factor.

In addition to a single envelope 506, the evaluation group may include threaded connections in multiple envelopes or with individual threaded connections. For example, an evaluation group may include a first plurality (i.e., group) of threaded connections and a second plurality of threaded connections. The first and second groups may be formed into an envelope based on connection geometry to define the evaluation group. Alternatively, the first and second groups may be formed into a plurality of envelopes based on connection geometry to define the evaluation group. In another embodiment, the first and second groups are formed from an envelope with a portion of the second group of threaded connections falling outside the geometric bounds defined by the first group of threaded connections. As a final example, the first and second groups are formed into a plurality of envelopes with a portion of the second group of threaded connections falling outside the geometric bounds defined by the first group of threaded connections.

Further, as noted above, different combinations of the characteristic performance factors may be utilized. For instance, the sealability factor and galling resistance factor may be utilized individually on the same evaluation group. This type of evaluation may be performed in a manner similar to the discussion above. Then, the results may be combined to exclude different threaded connections that do not satisfy both factors. Accordingly, based on this approach, two, three, four or more factors may be utilized together for certain evaluations.

In addition to the discussion above, it should be noted that tubular members may have different appearances than presented in FIGS. 2A-2B. These differences may include, but are not limited to, location and geometry of connection features, such as seal, shoulder, threads, etc. In addition, the joining mechanism may occur via coupler or other threaded connections. As such, these different features may be within the scope of the present techniques.

While the present techniques of the invention may be susceptible to various modifications and alternative forms, the exemplary embodiments discussed above have been shown by way of example. However, it should again be understood that the invention is not intended to be limited to the particular embodiments disclosed herein. Indeed, the present techniques of the invention are to cover all modifications, equivalents, and alternatives falling within the spirit and scope of the invention as defined by the following appended claims.

What is claimed is:

1. A method associated with the production of hydrocarbons using tubular member comprising threaded connections, the method comprising:

determining constituents of an evaluation group of threaded connections the constituents comprising a first plurality of the threaded connections and a second plurality of the threaded connections;

conducting physical testing on each constituent of the first plurality of the threaded connections at a plurality of test conditions to test connection performance of the tested constituent at each of the plurality of tested load and pressure test conditions, producing a first plurality of tested connection performance results;

performing modeling analysis on each constituent of the first plurality of threaded connections at a plurality model conditions to determine a modeled connection performance factor for each of the modeled plurality of modeled conditions, producing a first plurality of modeled connection performance factors for each modeled constituent of the first plurality of threaded connections;

comparing for each constituent the first plurality of tested connection performance results and the first plurality of modeled connection performance factors to determine a characteristic performance factor for each constituent of the first plurality of threaded connections;

comparing each of the determined characteristic performance factor for each constituent of the first plurality of threaded connections with each other to determine a first plurality constituent group characteristic performance factor;

performing modeling analysis on each constituent of the second plurality of threaded connections at a plurality of model conditions to determine a second plurality modeled connection performance factor for each of the plurality of modeled conditions, producing a second plurality of modeled connection performance factors for each modeled constituent of the second plurality of threaded connections;

applying the first plurality constituent group characteristic performance factor to the second plurality of threaded connection constituents to define an acceptable range of performance limits for at least one of the second plurality of threaded connections;

obtaining tubular members from the constituents based upon the defined acceptable range of performance limits obtained in the evaluation of the threaded connections;

installing the obtained tubular members within a wellbore; and producing a formation fluid from the wellbore containing the tubular members.

2. The method of claim 1 wherein the evaluating the evaluation group of threaded connections comprises:

determining constituents of an evaluation group via model analysis, wherein the evaluation group comprises the first plurality of the threaded connections and the second plurality of the threaded connections wherein the second plurality of threaded connections are not physically tested;

comparing results from the physical testing and the modeling analysis to assess a characteristic performance factor for the first plurality of threaded connections;

applying the characteristic performance factor to the second plurality of threaded connections, and defining the performance limits for the constituents based on the characteristic performance factor.

3. The method of claim 1 wherein the evaluation group comprises threaded connections having consistent features.

4. The method of claim 3 wherein the consistent features comprise at least one of seal design, thread design, shoulder location and any combination thereof over a defined range.

5. The method of claim 1 wherein the evaluation group comprises threaded connections exhibiting consistent performance characteristics.

6. The method of claim 5 wherein the consistent performance characteristics comprises at least one of mechanical response to applied loads, response of contact pressure to changes in mechanical loading and response of contact pressure to make-up conditions.

7. The method of claim 1 comprising forming the first plurality of threaded connections and the second plurality of threaded connections into at least one envelope based on connection geometry to define the evaluation group.

8. The method of claim 1 comprising forming the first plurality of threaded connections and the second plurality of threaded connections into at least one envelope with a portion of the second plurality falling outside geometric bounds defined by the first plurality.

9. The method of claim 1 wherein the modeling analysis comprises finite element analysis.

10. The method of claim 9 wherein the finite element analysis comprises at least one of calculating stress-strain response of features to applied boundary conditions, calculating contact pressure between features and calculating strains at the surfaces of features.

11. The method of claim 1 wherein the evaluation group of threaded connections comprises threaded connections between tubular members utilized in producing hydrocarbons.

12. The method of claim 1 wherein the physical testing comprises at least one of make-up and break-out tests, tension or compression to failure tests, collapse or burst tests, liquid sealability or gas sealability tests, fatigue tests, bending tests, thermal cycling and thermal quench tests.

13. The method of claim 1 wherein the characteristic performance factor comprises at least one of a sealability factor, a structural integrity factor, a galling resistance factor, a fatigue resistance factor, an environmental resistance factor, and any combination thereof.

14. The method of claim 13 wherein the sealability factor is defined as how well pressurized reservoir or injection fluids are contained within the threaded connection formed by two tubular members.

15. The method of claim 13 wherein the characteristic performance factor is based at least in part on manufacturing conditions comprising at least one of base material properties, surface finish, feature dimensions and interferences between features.

16. The method of claim 13 wherein the characteristic performance factor is based at least in part on conditions during assembly and installation of the threaded connection, comprising at least one of make-up torque, make-up speed and thread compound.

17. The method of claim 13 wherein the characteristic performance factor is based at least in part on service conditions of the threaded connection comprising at least one of temperature, pressure, tensile load, compressive load, bending load, and torsional load.

18. The method of claim 13 wherein the sealability factor is based at least in part on the physical properties of fluids contained by the tubular members in a prospective application.

19. The method of claim 13 wherein the structural integrity factor is defined as how well applied loads are distributed among threaded connection features.

20. The method of claim 13 wherein the galling resistance factor is defined as how well surface damage due to frictional sliding is endured by threaded connection features.

21. The method of claim 13 wherein the fatigue resistance factor is defined as how well cyclic loading is endured by features of the threaded connection.

22. The method of claim 13 wherein the environmental resistance factor is defined as how well applied loads and resultant stresses and strains are handled by features of the threaded connection in the presence of an aggressive environment.

23. The method of claim 1 wherein the produced formation fluid comprises hydrocarbons.

24. The method of claim 1, further comprising:

prior to conducting physical testing on a constituent of the first plurality of the threaded connections, making up a threaded connection for that constituent to a torque within a prescribed torque range.

25. The method of claim 1, further comprising conducting the physical testing on each constituent of the first plurality of the threaded connections at a plurality of load and pressure test conditions within a load and pressure test range to test connection performance of the tested constituent at each of the plurality of tested load and pressure test conditions, producing a first plurality of tested connection performance results.

* * * * *